(No Model.)

P. G. GARDNER.
TIRE SECURING DEVICE.

No. 587,723. Patented Aug. 10, 1897.

Witnesses:
L. C. Hills.
E. H. Bond.

Inventor:
Perry G. Gardner,
by E. B. Stocking
Atty.

UNITED STATES PATENT OFFICE.

PERRY G. GARDNER, OF BOUND BROOK, NEW JERSEY, ASSIGNOR OF SEVEN-SIXTEENTHS TO HORATIO V. S. NEGUS, OF SAME PLACE.

TIRE-SECURING DEVICE.

SPECIFICATION forming part of Letters Patent No. 587,723, dated August 10, 1897.

Application filed May 4, 1896. Serial No. 590,111. (No model.)

*To all whom it may concern:*

Be it known that I, PERRY G. GARDNER, a citizen of the United States, residing at Bound Brook, in the county of Somerset, State of New Jersey, have invented certain new and useful Improvements in Tire-Securing Devices, of which the following is a specification, reference being had therein to the accompanying drawings.

This invention relates to certain new and useful improvements in means for securing a tire of any nature to the periphery of a wheel or rim, and while adapted especially for securing the tire of a bicycle to its rim it is not restricted to such form of wheel.

The invention has for its object, primarily, to provide a simple, cheap, and efficient means to be employed instead of the liquid cement now used for fastening the tire in position. It is a well-known fact that in using this liquid cement it is liable to run over the edge of the rim onto the inner periphery thereof and to drop into the spokes and hub. It is also very liable in warm weather to ooze out at the edge of the rim and present an unsightly appearance. It is a further fact that to apply the tire and fasten by the use of liquid cement necessitates the soiling of the hands and also results in the uneven distribution and application of the cement. All of these objections I overcome by the adoption of my improvement, which consists, primarily, in the employment of a tape treated with a viscous compound upon both sides placed in the hollow of the rim and the tire applied thereupon, the tape sticking to the rim and the tire being held to the tape. The tape is preferably of such a width as to have its edges concealed by the tire when in position, and the compound from the tape will not ooze out or run in hot weather.

Other objects and advantages of the invention will hereinafter appear, and the novel features thereof will be particularly pointed out in the claims.

The invention is clearly illustrated in the accompanying drawings, which, with the letters of reference marked thereon, form a part of this specification, and in which—

Figure 1:
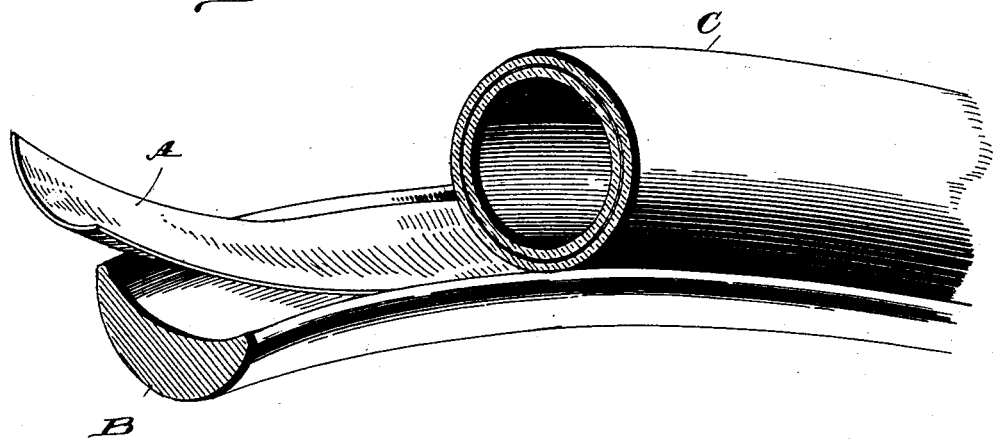
Figure 2:
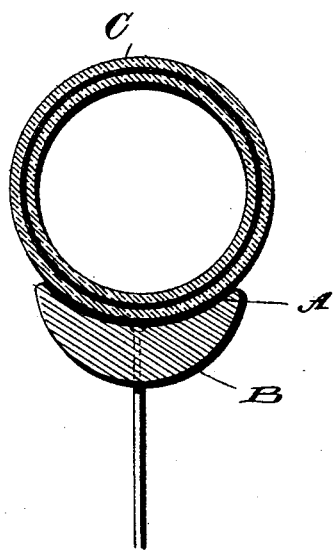

Figure 1 is a perspective detail showing a portion of a rim and tire with my improvement applied, and Fig. 2 is a cross-section through the rim with the tire secured therein.

Like letters of reference indicate like parts throughout both views.

Referring now to the details of the drawings by letter, A designates the tape treated or saturated upon both sides with any suitable or preferred kind of viscous or adhesive non-drying material or compound suitable for the purpose and of such a width as to be confined within the hollow or concavity of the rim B, to which it is applied. The tape may be of any desired material and of any required thickness, and the invention is in no wise restricted to the character of the adhesive material thereupon. A compound suitable for the purpose may be formed of a mixture of balata and North Carolina tar, which is applied to the tape to render the same viscous or sticky, the proportions of this mixture being in accord with the viscousness desired.

In practice the tape is applied by extending the same around the periphery of the rim and then applying the tire C, of any well-known form. The tire being placed in position in the usual way a slight pressure thereupon causes the same to adhere to the tape and the tape to adhere to the rim. It is proposed to make the tape in strips of any desired length, from which the desired amount may be cut as it is to be used. The tape is concealed by the tire. It provides a backing therefor and quite materially aids in strengthening the rim. The tire may be freely removed for repairs and quickly replaced without soiling the hands.

Modifications in detail may be resorted to without departing from the spirit of the invention or sacrificing any of its advantages.

Having thus described my invention, what I claim as new, and desire to secure by Letters Patent, is—

1. The combination with a wheel-rim, of a tape independent of the rim and tire provided upon opposite sides with a viscous adhesive material, and seated in the concavity of said rim with one face secured to the rim, and the opposite face adapted to receive and secure in position a tire, substantially as described.

2. The combination with a wheel-rim, of a tape independent of the rim and tire and extending around the periphery of the rim and seated in the concavity thereof, and having viscous adhesive material upon opposite sides, and a tire arranged about said rim, and secured in position by the viscous material upon the outer face of said tape, substantially as described.

3. The combination with a wheel-rim, of a tape independent of the rim and tire and extending around the periphery of the rim and seated in the concavity thereof, and having viscous adhesive material upon opposite sides, and a tire arranged about said rim, and secured in position by the viscous material upon the outer face of said tape, said tape being of less width than the transverse surface of the rim, substantially as described.

4. The combination with a bicycle-wheel rim, a tire, and an interposed strip of tape provided with a viscous adhesive substance upon both sides, said tape being placed within the rim and the tire placed upon said tape whereby the tire is secured to the rim solely by said tape without the interposition of any cement, substantially as and for the purpose described.

In testimony whereof I affix my signature in presence of two witnesses.

PERRY G. GARDNER.

Witnesses:
H. C. SUYDAM,
HORATIO V. S. NEGUS.